United States Patent
Cardonha et al.

(10) Patent No.: US 9,672,476 B1
(45) Date of Patent: *Jun. 6, 2017

(54) CONTEXTUAL TEXT ADAPTATION

(71) Applicant: International Business Machines Corporation, Armonk, NY (US)

(72) Inventors: Carlos H. Cardonha, Sao Paulo (BR); Stefany Mazon, Sao Paulo (BR); Debora L. Nascimento Ciriaco Pereira, Sao Paulo (BR); Nicole B. Sultanum, Toronto (CA)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/226,205

(22) Filed: Aug. 2, 2016

Related U.S. Application Data

(63) Continuation of application No. 14/976,575, filed on Dec. 21, 2015.

(51) Int. Cl.
| | |
|---|---|
| *G06F 15/18* | (2006.01) |
| *G06N 99/00* | (2010.01) |
| *G06F 17/27* | (2006.01) |
| *G06N 7/00* | (2006.01) |
| *G06F 17/30* | (2006.01) |

(52) U.S. Cl.
CPC ....... *G06N 99/005* (2013.01); *G06F 17/2735* (2013.01); *G06F 17/2795* (2013.01); *G06F 17/30011* (2013.01); *G06N 7/005* (2013.01)

(58) Field of Classification Search
None
See application file for complete search history.

(56) References Cited

U.S. PATENT DOCUMENTS

| | | | |
|---|---|---|---|
| 5,742,834 A | * | 4/1998 | Kobayashi .......... G06F 17/2795 704/10 |
| 6,556,987 B1 | | 4/2003 | Brown et al. |
| 7,503,000 B1 | | 3/2009 | Kreulen et al. |

(Continued)

FOREIGN PATENT DOCUMENTS

| | | |
|---|---|---|
| CN | 1577325 A | 2/2005 |
| WO | WO2013185856 A1 | 12/2013 |

OTHER PUBLICATIONS

Jacquemin, B., et al. (2002), Enriching a text by semantic disambiguation for information extraction, in Proceedings of the Third Conference on International Language Resources and Evaluation LREC 2002. Using Semantics for Information Retrieval and Filtering, Las Palmas (Spain), May 26-Jun. 2, 2002, p. 43-49.

Muller, P., et al., "Synonym Extraction Using a Semantic Distance on a Dictionary", Workshop on TextGraphs, at HLT-NAACL, New York City, Jun. 2006, pp. 65-72.

(Continued)

*Primary Examiner* — Paulinho E Smith
(74) *Attorney, Agent, or Firm* — Scully, Scott, Murphy & Presser, P.C.; Louis J. Percello, Esq.

(57) ABSTRACT

Contextual adaptation of documents automatically replaces words for synonyms that appear within context or topic whey they are being used. A machine learned topic modeling, trained by a set of documents representative of a target user is executed to determine topics of an input document, and to determine words in the document to replace based on determining the relevance of the words to the topics in the documents. An output document is generated based on the input document with the replaced words.

18 Claims, 4 Drawing Sheets

(56) References Cited

U.S. PATENT DOCUMENTS

| | | | |
|---|---|---|---|
| 8,209,163 B2 | 6/2012 | Suzuki et al. | |
| 8,332,221 B2* | 12/2012 | Peters | G06F 17/27 704/236 |
| 8,428,934 B2 | 4/2013 | Connor | |
| 8,442,811 B1 | 5/2013 | Broniek et al. | |
| 8,510,328 B1 | 8/2013 | Hatton | |
| 8,527,259 B1 | 9/2013 | Broniek et al. | |
| 8,612,203 B2 | 12/2013 | Foster et al. | |
| 8,812,296 B2 | 8/2014 | Selegey et al. | |
| 8,849,651 B2 | 9/2014 | Selegey et al. | |
| 2011/0184727 A1* | 7/2011 | Connor | G06F 17/274 704/9 |
| 2015/0193425 A1* | 7/2015 | Kusumura | G06F 17/27 704/9 |

OTHER PUBLICATIONS

Herbelot, A., "Finding Word Substitutions Using a Distributional Similarity Baseline and Immediate Context Overlap", Proceedings of the EACL 2009 Student Research Workshop, Athens, Greece, Apr. 2, 2009, pp. 28-36.
Chung, T.M., et al., "Identifying technical vocabulary", System, vol. 32, Issue 2, Jun. 2004, pp. 251-263.
"Understanding Medical Words: A Tutorial from the National Library of Medicine", https://www.nlm.nih.gov/medlineplus/medicalwords/, updated Jul. 1, 2015, 2 pages.
"Gensim Topic Modelling for humans", http://radimrehurek.com/gensim/, updated Nov. 7, 2015, 2 pages.
"Stanford Topic Modeling Toolbox", http://nlp.stanford.edu/software/tmt/tmt-0.4/, Version 0.4.0, first released in Sep. 2009, 4 pages.
List of IBM Patents or Patent Applications Treated as Related dated Aug. 2, 2016, 2 pages.

* cited by examiner

CONTEXTUAL TEXT ADAPTATION

CROSS-REFERENCE TO RELATED APPLICATIONS

This application is a continuation of U.S. patent application Ser. No. 14/976,575, filed Dec. 21, 2015, the entire content and disclosure of which is incorporated herein by reference.

FIELD

The present application relates generally to computers and computer applications and more particularly to machine learning and contextual text adaptation by machine learning.

BACKGROUND

There are automatic tools that analyze documents and process texts, for example, using natural language processing and statistical learning methods. Other tools build dictionaries from a text corpus. Yet other tools perform language translations. The present disclosure in one embodiment addresses contextual text adaptation.

BRIEF SUMMARY

A computer-implemented method and method for contextual text adaptation may be provided. The method in one aspect may include receiving a corpus of documents in context of a target user. The method may also include receiving a dictionary of words. The method may further include receiving a dictionary of synonyms. The method may also include generating a topic model algorithm based on the corpus of documents and the dictionary of words by machine learning, the topic model algorithm comprising a first function that predicts probability distribution of a plurality of topics in a given document, and a second function that predicts probability of a given word occurring in a document associated with a given topic. The method may also include storing the first function and the second function of the topic model algorithm in a storage device. The method may also include receiving an input document. The method may further include determining input document topics associated with the input document and a normalized weight associated with each of the input document topics by executing the first function. The method may also include determining an aggregate probability indicating relevance of an input document word to the input document topics based on executing the second function. The method may also include determining a synonym of the input document word based on the dictionary of synonyms. The method may also include determining an aggregate probability for the synonym based on executing the second function. The method may also include comparing the aggregate probability for the synonym and the aggregate probability for the input document word. The method may also include, responsive to determining that the aggregate probability for the synonym is greater than the aggregate probability for the input document word, replacing the input document word with the synonym. The method may further include generating an output document comprising content of the input document with replaced word.

A system for contextual text adaptation, in one aspect, may include one or more hardware processors. A topic model algorithm may be executable on one or more of the hardware processors, the topic model algorithm generated by machine learning based on a corpus of documents related to context of a target user and a dictionary, the topic model comprising a first function that predicts probability distribution of a plurality of topics in a given document, and a second function that predicts probability of a given word occurring in a document associated with a given topic, the dictionary comprising a list of words considered for substitution. One or more of the hardware processors may be operable to receive an input document. One or more of the hardware processors may be further operable to determine input document topics associated with the input document and a normalized weight associated with each of the input document topics by executing the first function. One or more of the hardware processors may be further operable to determine an aggregate probability indicating relevance of an input document word to the input document topics based on executing the second function. One or more of the hardware processors may be further operable to determine a synonym of the input document word based on a dictionary of synonyms. One or more of the hardware processors may be further operable to determine an aggregate probability for the synonym based on executing the second function. One or more of the hardware processors may be further operable to compare the aggregate probability for the synonym and the aggregate probability for the input document word. Responsive to determining that the aggregate probability for the synonym is greater than the aggregate probability for the input document word, one or more of the hardware processors may be further operable to replace the input document word with the synonym. One or more of the hardware processors may be further operable to generate an output document comprising content of the input document with replaced word.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

DETAILED DESCRIPTION

In one embodiment, a methodology of the present disclosure may provide for adaptation, or simplification, and/or contextualization of a document or text or the like, based on the use of words that may be easier or are more familiar to an individual. For instance, the methodology may be used to adapt a document or text by changing words from one context to another context, for example, into vocabulary that are easier or familiar to an individual in a given context or field to understand. For example, text may be translated from the context of a scientific research into words more familiar to or used in a business management context. As another example, medical terms may be translated into layperson language. The methodology may be useful in a social sciences context, to better capture and handle with tacit knowledge through the identification and manipulation of context-specific terms. In the present disclosure, the term document is used to refer to text that may be translated.

A system, method and techniques of the present disclosure in one embodiment may provide adaptations of documents by substituting words for synonyms or the like that appear more frequently within the context (or topic) where they are being used. Such process in the present disclosure may be referred to as a contextual adaption of a document. In one embodiment, this substitution is made by implementing a topic modeling algorithm trained by a set of documents (a corpus) representative of the target user. This corpus may encompass documents frequently used, as well as books and newspapers perused by that individual, and help set the context of that person. A set of technical words may be substituted by others words which are more easily understandable to the particular individual. For instance, when a patient with a non-medical background is reading a medical article, replacing "cephalgia" with "headache" will likely make more sense and make the text easier to understand to the patient. Conversely, a lay text may be converted into a more technical one, by using a technical corpus instead.

Figure 1:
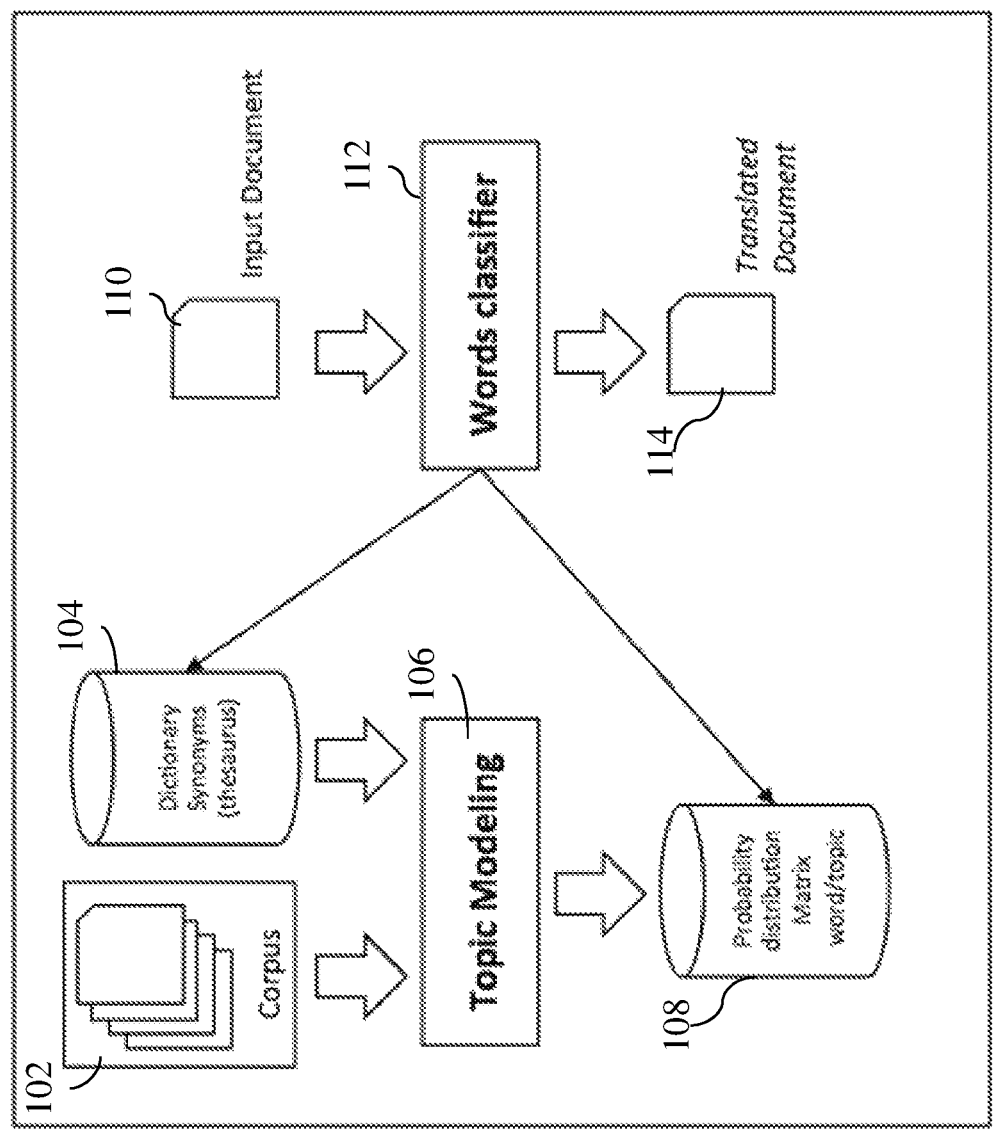
FIG. 1 is a diagram illustrating components of contextual text adaptation system in one embodiment of the present disclosure.

FIG. 1 is a diagram illustrating components of contextual text adaptation system in one embodiment of the present disclosure. Adaptations of documents may include substituting words for synonyms that appear more frequently within the context the target user belongs to. The system may use as input a corpus of data or documents 102 and a dictionary of synonyms 104, for instance, including a list of terms. In one embodiment, the corpus 102 represents the context the user is subject to. The system generates and trains a topic modeling algorithm 106 based on the corpus 102 and the dictionary 104. Using the topic modeling algorithm that has been trained, the system may translate documents as follows: The words in the dictionary are associated with values, given by the sum of their occurrence percentage for each topic multiplied by the weight of the respective topic on the document; The system substitutes each word (or a subset of these words) by its synonym associated with the highest value for each user context.

Topic modeling is a type of statistical model for discovering the abstract "topics" that occur in a collection of documents. A computer-implemented topic model of the present disclosure in one embodiment expects that particular words appear in a document more or less frequently, given that the document is about a particular topic. A topic model of the present disclosure may provide a framework that allows examining a set of documents and discovering, based on the statistics of the words in each, what the topics might be and what each document's balance of topics is.

A training stage, also referred to as precomputing stage, may include identification of topics emerging from a corpus, by topic modeling. An input for the topic modeling algorithm 106 may include a corpus 102, which includes a collection of representative documents of a given domain or context that is to be represented. An example of a corpus may include a list of articles from blogs that a target user frequently visits. Another input for the topic modeling algorithm 106 may include a dictionary containing the words that may be considered for substitution and a dictionary of synonyms, e.g., thesaurus website or the like, containing pairwise associations between the words of the dictionary, indicating their similarity shown at 104. The dictionary containing the list of all words that are to be considered for substitution may be an online dictionary or another dictionary. Such dictionary may contain modern words such as "Internet," "selfie," "blog," and/or others. The dictionary may be used for all users generally. For example, different users may use any word appearing in the dictionary, albeit with different probability of usage occurrence. The dictionary of synonyms includes words that are similar or have the same or similar meanings. An example of a dictionary of synonyms is a Thesaurus, e.g., an online Thesaurus.

The output of this stage may yield a probability distribution matrix of words and topic 108. In one embodiment, the probability distribution matrix may include two functions. Function Dist(d) takes a document d, represented by the set or bag of its words which also belong to the dictionary, and returns a probability distribution $\{p(t1), p(t2), p(t3) \ldots p(tm)\}$ for topics $\{t1, t2, t3, \ldots tm\}$, indicating the relevancy or pertinence probabilities of each topic on document d. m represents the number of topics. Function P(w, t) takes a word w in the dictionary and a topic t as input parameters and returns the probability of w occurring in a document whose topic is t.

In one embodiment, available topic modeling tool or algorithm may be used for the topic modeling of the present disclosure. In the methodology of the present disclosure in one embodiment, a corpus of documents and a dictionary containing words considered for substitution are input to a known topic modeling algorithm. The model modeling tool returns a classification algorithm, which is applied to documents posteriorly.

Text adaptation stage in one embodiment of the present disclosure may include the following processing. For example, a computer-implemented word classifier 112 executing on a computer may perform the text adaptation. For an input document d 110, the system computes Dist(d) by running or executing the probability distribution function at 108, and obtains the normalized weight of each topic on the document, e.g., vector $(p(t1), p(t2), p(t3) \ldots p(tm))$ such that $0<=p(ti)<=1$ for $1<=i<=m$ and $p(t1)+p(t2)+ \ldots + p(tm)=1$.

For each word in document d 110, the system computes the probability P(w,t) for each topic by running or executing the probability distribution function 108, and uses the normalized weight associated with the topics to compose a general probability GP(w) for the word w, given by $GP(w)=(p(t1)*P(w,t1))+(p(t2)*P(w,t2))+ \ldots +(p(tm)*P(w,tm))$. This general probability indicates relevance of a word to the topics in the document.

For all synonyms $\{s1, s2, \ldots, sx\}$ of w in the dictionary of synonyms 104, the system calculates the general probability GP, and stores the highest of these probabilities, GP(s_max). GPs for the synonyms may be calculated based on the p and P values computed above. If GP(s_max)>GP(w), then w is replaced by s_max in the document d; if not, w remains unchanged. An output is a translated document 114 having the replaced words. In this way, a synonym word that occurs with higher probability for a given individual, given a document with configuration of topics.

In another embodiment, synonyms may be associated with a value respectively. For example, each pair of words may be associated with a value indicating the probability with which the second word is a suitable synonym for the first. In one embodiment, this value may be given. In another embodiment, the value may be computed by counting the relative frequency with which both terms are used in a same document of the corpus. By construction, this may yield a value between 0 and 1; if it is closer to 0, than the pair of words is considered not to be related, and if it is closer to 1, than the pair of words is considered to be related. This value may be employed in the estimation of general probability GP(w). For instance, given a word w and a synonym w', substitute GP(w') for GP(w)'=sim(w,w')*[(p(t1)*P(w,t1))+(p(t2)*P(w,t2))+ . . . +(p(tm)*P(w,tm))], where sim(w,w') is the value indicating the probability with which the second word is a suitable synonym for the first.

Text adaptation may include word substitution pertaining to particular context. For example, the system may use context to define what is easier to understand for the target user. In one embodiment of the present disclosure, the system of the present disclosure takes context or topic composition into account when implementing a word-substitution-based approach, for example, by building a topic model from a corpus 102 associated with a particular individual or context. The system may infer the best adaptation based on the type of content the target user consumes, for example, making the resulting document easier to understand to the target user. In this way, words may be substituted in a contextualized and/or individualized way. In this way also, the system provides improvement to accessibility of documents by different individuals.

Figure 2:
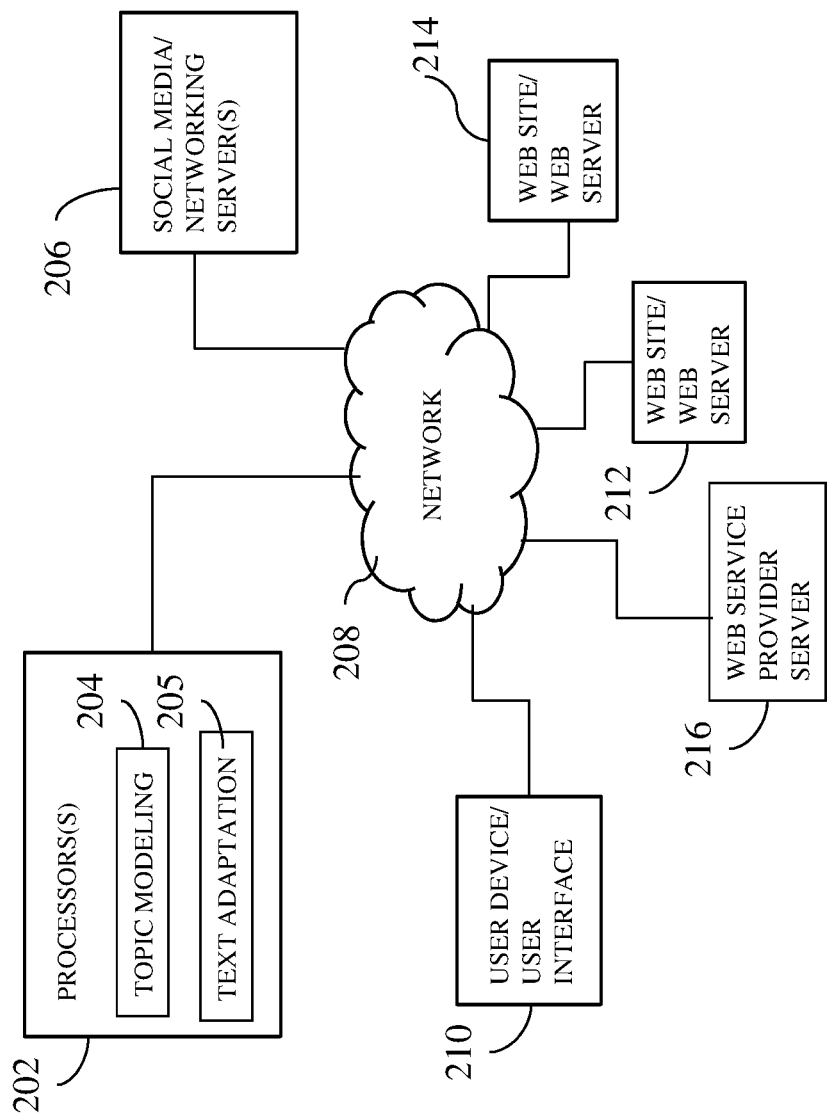
FIG. 2 is another diagram illustrating components of a system of the present disclosure in one embodiment.

FIG. 2 is another diagram illustrating components of a system of the present disclosure in one embodiment. One or more hardware processors 202 may be operable to perform contextual text adaptation. For instance, one or more of the hardware processors may execute a topic model 204, for example, generated by machine learning based on a corpus of documents related to a given context, for example, context of a target user, and a dictionary. The topic model may include a first function that predicts probability distribution of a plurality of topics in a given document, and a second function that predicts probability of a given word occurring in a document associated with a given topic. The topic model may have been pre-built, and one or more of the hardware processors may execute the topic model.

In one embodiment, one or more of the hardware processors 202 may be operable to generate the topic model 204, for example, as described with reference to FIG. 1. For example, one or more hardware processors may be communicatively coupled to a social media server 206 or the like via, for instance, over a network 208 or locally, which a target user via a user device 210 may interact or share interests with others, and access web postings, read posted articles or the like, access another web server 212, 214 to read or view articles or another content. One or more of the hardware processors 202 may receive or retrieve a corpus of documents associated with the target user or in context of the target user, for example documents that the target user accesses or reads. One or more of the hardware processors may build or generate the topic model based on the corpus of documents and a dictionary of words.

Based on the topic model trained by machine learning, one or more of the hardware processors 202 may perform text adaption 205 on a given input document. For instance, one or more of the hardware processors may receive an input document, and determine input document topics associated with the input document and a normalized weight associated with each of the input document topics by executing the first function. One or more of the hardware processors 202 may determine an aggregate probability (also referred to above a general probability) indicating relevance of an input document word to the input document topics, based on executing the second function. One or more of the hardware processors may determine a synonym of the input document word based on a dictionary of synonyms and determine an aggregate probability (also referred to above a general probability) for the synonym based on executing the second function. The aggregate probability for the synonym and the aggregate probability for the input document word are compared. If the aggregate probability for the synonym is greater than the aggregate probability for the input document word, one or more of the hardware processors 202 may replace the input document word with the synonym, generating an output document that includes the content of the input document with replaced word.

One or more of the hardware processors may determine the aggregate probability of the input document word, determine the aggregate probability for the synonym, compare the aggregate probability for the synonym and the aggregate probability for the input document word, and replace the input document word with the synonym responsive to determining that the aggregate probability for the synonym is greater than the aggregate probability for the input document word, for each of a plurality of input document words in the input document.

The aggregate probability for the input document word may be determined as a sum of joint probabilities, e.g., as a sum of a product of the probability that the input document word is associated with an input document topic and the normalized weight of the input document topic, over all input document topics, e.g., GP(w) described above with reference to FIG. 1. Further, there may be multiple synonyms determined for the input document word, and the aggregate probability may be determined for each of the multiple synonyms. The synonym with maximum aggregate probability among the multiple synonyms is selected for the comparing with the aggregate probability for the input document word.

The output document, for example, may be presented to the target user, e.g., via a user device 210 or others. For instance, the methodology of the present disclosure may be integrated with a social media and/or social network server 206 or the like, and may function to present the contextual text adaptation output to a target user responsive to the target user accessing content on the social media/network server 206. As another example, the methodology of the present disclosure may be integrated with a web browser, a web service provider server 216, or the like and may function to present the contextual text adaptation output to a target user responsive to the target user accessing content on the web or Internet.

Figure 3:
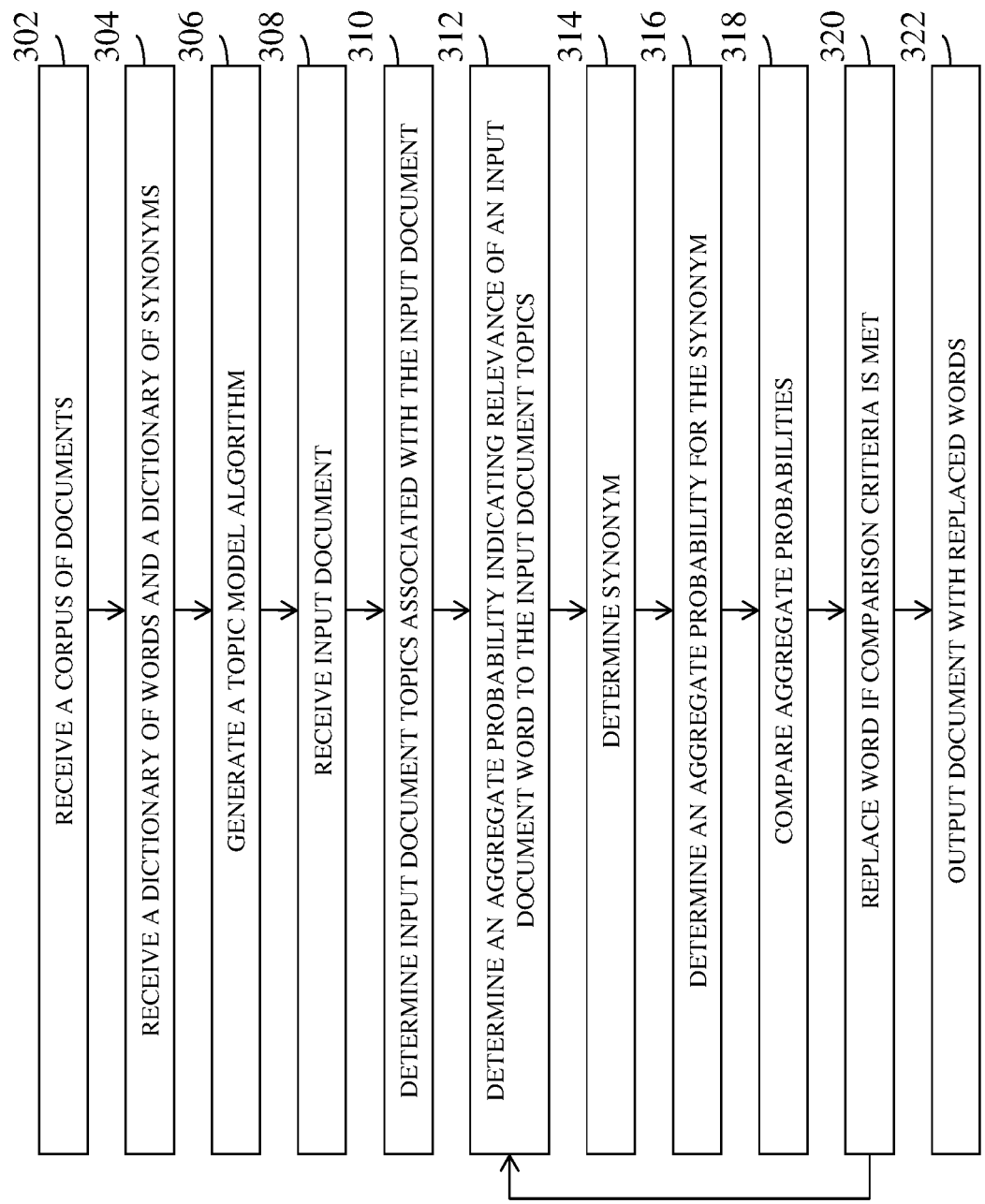
FIG. 3 is a flow diagram illustrating a method of contextual text adaptation in one embodiment of the present disclosure.

FIG. 3 is a flow diagram illustrating a method of contextual text adaptation in one embodiment of the present disclosure. At 302, a corpus of documents in context of a target user may be received. For instance, the documents may include those that the target user accesses frequently (e.g., greater than a threshold number of times), for example, in a social media site such a blog site, and/or others. At 304, a dictionary containing a list of words considered for substitution (also referred to as a dictionary of words) and a dictionary of synonyms may be received. At 306, a topic model algorithm may be generated based on the corpus of documents and the dictionary of words by machine learning. The topic model algorithm may include a first function that predicts probability distribution of a plurality of topics in a given document, and a second function that predicts probability of a given word occurring in a document associated with a given topic. The topic model algorithm including the first function and the second function may be stored in a storage device.

In performing a contextual adaptation of a document, an input document may be received at 308. At 310, the first function may be executed to determine input document topics associated with the input document and a normalized weight associated with each of the input document topics.

At 312, based on executing the second function for each of the input document topics, an aggregate probability (also referred to above as a general probability) indicating relevance of an input document word to the input document topics may be determined. For example, the aggregate probability for the input document word may be determined as a sum over all the input document topics, a product of the probability that the input document word is associated with an input document topic and the normalized weight of the input document topic, e.g., GP(w) described above with reference to FIG. 1.

At 314, a synonym to the input document word may be determined based on the dictionary of synonyms. At 316, an aggregate probability for the synonym may be determined based on executing the second function. At 318, the aggregate probability for the synonym and the aggregate probability for the input document word are compared. At 320, responsive to determining that the aggregate probability for the synonym is greater than the aggregate probability for the input document word, the input document word may be replaced with the synonym. The processing at 316, 318 and 320 may be repeated for each of a plurality of input document words in the input document. For an input document word that has multiple synonyms, the processing at 316 may include determining the aggregate probability for each of the multiple synonyms and the synonym with maximum aggregate probability among the multiple synonyms may be selected for the comparing at 318.

At 322, an output document may be generated that includes the content of the input document with replaced word. The output document may be presented on a user interface display. The output document may also be presented as an audio via a voice synthesizer.

Figure 4:
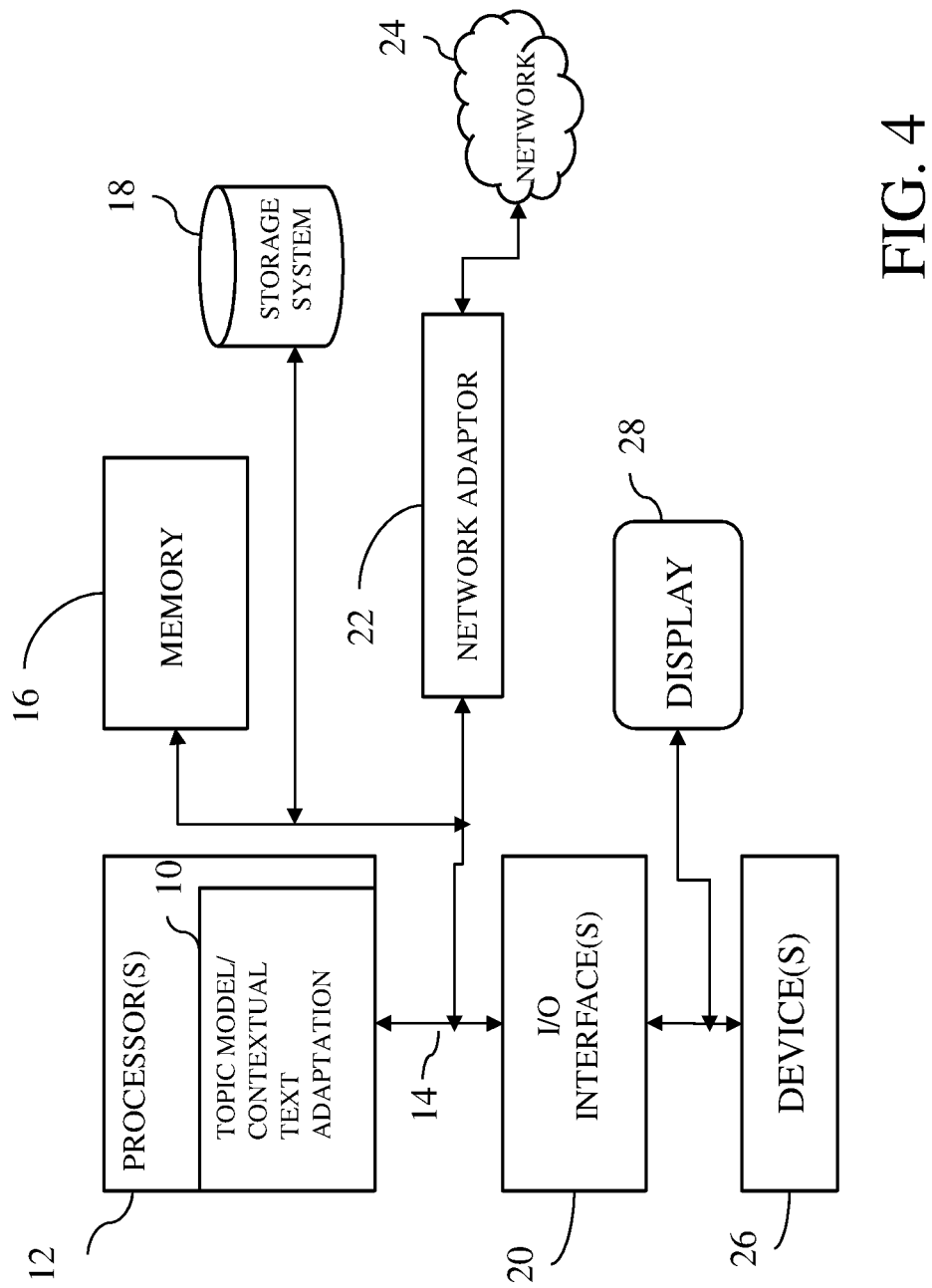
FIG. 4 illustrates a schematic of an example computer or processing system that may implement a contextual text adaptation system in one embodiment of the present disclosure.

FIG. 4 illustrates a schematic of an example computer or processing system that may implement a contextual text adaptation system in one embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 4 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a topic modeling and/or contextual text adaptation module 10 that performs the methods described herein. The module 10 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

We claim:

1. A system for contextual text adaptation, comprising:
   one or more hardware processors;
   a topic model algorithm executable on one or more of the hardware processors, the topic model algorithm generated by machine learning based on a corpus of documents at least related to context of a target user, the topic model comprising a first function that predicts probability distribution of a plurality of topics in a given document, and a second function that predicts probability of a given word occurring in a document associated with a given topic,
   one or more of the hardware processors operable to receive an input document,
   one or more of the hardware processors further operable to determine input document topics associated with the input document and a normalized weight associated with each of the input document topics by executing the first function,
   one or more of the hardware processors further operable to determine an aggregate probability indicating relevance of an input document word to the input document topics based on executing the second function,
   one or more of the hardware processors further operable to determine a synonym of the input document word based on a dictionary of synonyms,
   one or more of the hardware processors further operable to determine an aggregate probability for the synonym based on executing the second function,
   one or more of the hardware processors further operable to compare the aggregate probability for the synonym and the aggregate probability for the input document word, and
   responsive to determining that the aggregate probability for the synonym is greater than the aggregate probability for the input document word, one or more of the hardware processors further operable to replace the input document word with the synonym,
   one or more of the hardware processors further operable to generate an output document comprising content of the input document with replaced word.

2. The system of claim 1, wherein one or more of the hardware processors communicate with a social media server to retrieve the corpus of documents.

3. The system of claim 1, wherein the corpus of documents comprises web postings the target user accesses on the social media server.

4. The system of claim 1, wherein the social media server presents the output document on a web page associated with the social media server.

5. The system of claim 1, wherein one or more of the processors determines the aggregate probability indicating relevance of an input document word to the input document topics, determines the aggregate probability for the synonym, compares the aggregate probability for the synonym and the aggregate probability for the input document word, and replaces the input document word with the synonym responsive to determining that the aggregate probability for the synonym is greater than the aggregate probability for the input document word, for each of a plurality of input document words in the input document.

6. The system of claim 1, wherein the aggregate probability for the input document word is determined as a sum of products of the probability that the input document word is associated with an input document topic and the normalized weight of the input document topic.

7. The system of claim 1, wherein multiple synonyms are determined for the input document word and the aggregate probability is determined for each of the multiple synonyms, wherein the synonym with maximum aggregate probability among the multiple synonyms is selected for the comparing with the aggregate probability for the input document word.

8. A computer-implemented method of contextual text adaptation, the method performed by one or more hardware processors, comprising:
   receiving a corpus of documents in context of a target user;
   receiving a dictionary of synonyms;
   generating a topic model algorithm based on at least the corpus of documents by machine learning, the topic model algorithm comprising a first function that predicts probability distribution of a plurality of topics in a given document, and a second function that predicts probability of a given word occurring in a document associated with a given topic;
   receiving an input document;
   determining input document topics associated with the input document and a normalized weight associated with each of the input document topics by executing the first function;
   determining an aggregate probability indicating relevance of an input document word to the input document topics based on executing the second function;
   determining a synonym of the input document word based on the dictionary of synonyms;
   determining an aggregate probability for the synonym based on executing the second function;
   comparing the aggregate probability for the synonym and the aggregate probability for the input document word; and
   responsive to determining that the aggregate probability for the synonym is greater than the aggregate probability for the input document word, replacing the input document word with the synonym; and
   generating an output document comprising content of the input document with replaced word.

9. The method of claim 8, wherein the determining of an aggregate probability indicating relevance of an input document word to the input document, the determining of an aggregate probability for the synonym, the comparing of the aggregate probability for the synonym and the aggregate probability for the input document word, and the replacing of the input document word with the synonym responsive to determining that the aggregate probability for the synonym is greater than the aggregate probability for the input document word, is performed for each of a plurality of input document words in the input document.

10. The method of claim 8, wherein the aggregate probability for the input document word is determined as a sum of products of the probability that the input document word is associated with an input document topic and the normalized weight of the input document topic.

11. The method of claim 8, wherein multiple synonyms are determined for the input document word and the aggregate probability is determined for each of the multiple synonyms, wherein the synonym with maximum aggregate probability among the multiple synonyms is selected for the comparing with the aggregate probability for the input document word.

12. The method of claim 8, wherein the corpus of documents are received over a communication network from a social media server.

13. The method of claim 8, wherein the corpus of documents comprises web postings the target user accesses.

14. A computer readable storage medium storing a program of instructions executable by a machine to perform a method of contextual text adaptation, the method comprising:
    identifying a target user;
    receiving a corpus of documents in context of the target user;
    receiving a dictionary of synonyms;
    generating a topic model algorithm based on at least the corpus of documents by machine learning, the topic model algorithm comprising a first function that predicts probability distribution of a plurality of topics in a given document, and a second function that predicts probability of a given word occurring in a document associated with a given topic; and
    receiving an input document;
    determining input document topics associated with the input document and a normalized weight associated with each of the input document topics by executing the first function;
    determining a probability that an input document word is associated with an input document topic for each of the input document topics by executing the second function;
    determining an aggregate probability for the input document word as a sum of products of the probability that an input document word is associated with an input document topic and the normalized weight of the input document topic;
    determining a synonym of the input document word based on the dictionary of synonyms;
    determining an aggregate probability for the synonym;
    comparing the aggregate probability for the synonym and the aggregate probability for the input document word;
    responsive to determining that the aggregate probability for the synonym is greater than the aggregate probability for the input document word, replacing the input document word with the synonym; and
    generating an output document comprising content of the input document with replaced word.

15. The computer readable storage medium of claim 14, wherein the aggregate probability for the input document word is determined as a sum of products of the probability that the input document word is associated with an input document topic and the normalized weight of the input document topic.

16. The computer readable storage medium of claim 14, wherein multiple synonyms are determined for the input document word and the aggregate probability is determined for each of the multiple synonyms, wherein the synonym with maximum aggregate probability among the multiple synonyms is selected for the comparing with the aggregate probability for the input document word.

17. The computer readable storage medium of claim 14, wherein the corpus of documents are received over a communication network from a social media server.

18. The computer readable storage medium of claim 14, wherein the corpus of documents comprises web postings the target user accesses.

* * * * *